United States Patent
Iwata (10) Patent No.: US 9,663,168 B2
(45) Date of Patent: May 30, 2017

(54) STRADDLE-TYPE VEHICLE AND SEAT STRUCTURE THEREOF

(71) Applicant: KAWASAKI JUKOGYO KABUSHIKI KAISHA, Kobe-shi, Hyogo (JP)

(72) Inventor: Shigeyuki Iwata, Kakogawa (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 0 days.

(21) Appl. No.: 14/878,968

(22) Filed: Oct. 8, 2015

(65) Prior Publication Data
US 2016/0101819 A1 Apr. 14, 2016

(30) Foreign Application Priority Data

Oct. 10, 2014 (JP) .................................. 2014-209053
Oct. 10, 2014 (JP) .................................. 2014-209054

(51) Int. Cl.
*B62J 1/14* (2006.01)
*B62J 1/12* (2006.01)

(52) U.S. Cl.
CPC .. *B62J 1/14* (2013.01); *B62J 1/12* (2013.01)

(58) Field of Classification Search
CPC ...................................... B62J 1/14; B62J 1/12
See application file for complete search history.

(56) References Cited

U.S. PATENT DOCUMENTS

| 6,070,896 | A | * | 6/2000 | Saiki | B62J 1/14 280/288.4 |
| 6,913,099 | B2 | * | 7/2005 | Scott | B62J 1/12 180/219 |
| 7,036,837 | B1 | * | 5/2006 | Bauer | B62J 15/02 180/219 |
| 7,571,921 | B1 | * | 8/2009 | Hoeve | B62J 1/14 180/219 |
| 8,950,806 | B2 | * | 2/2015 | Smith | B62J 1/20 297/195.13 |
| 2011/0198898 | A1 | * | 8/2011 | Galati | B62J 1/14 297/195.13 |

FOREIGN PATENT DOCUMENTS

JP 10086874 A 4/1998

* cited by examiner

*Primary Examiner* — Kevin Hurley
*Assistant Examiner* — Marlon A Arce
(74) *Attorney, Agent, or Firm* — Alleman Hall Creasman & Tuttle LLP (57) ABSTRACT

A straddle-type vehicle comprises a vehicle body frame; a main seat on which a rider is seated; a sub-seat on which a passenger is seated, the sub-seat being separate from the main seat and placed behind the main seat; a bracket which is separate from the main seat and to which the sub-seat is mountable; and a first fastening member which fastens the bracket to the vehicle body frame such that the bracket is detachable from the vehicle body frame, wherein the main seat includes a stay protruding rearward, and wherein the stay and the bracket are fastened together to the vehicle body frame by use of the first fastening member.

13 Claims, 9 Drawing Sheets

STRADDLE-TYPE VEHICLE AND SEAT STRUCTURE THEREOF

CROSS-REFERENCE TO THE RELATED APPLICATION

This application claims priority to and the benefit of Japanese Patent Application Nos. 2014-209053 and 2014-209054, filed on Oct. 10, 2014, the entire disclosure of which is incorporated herein by reference.

BACKGROUND OF THE INVENTION

Field of the Invention

The present invention relates to a straddle-type vehicle including a main seat and a sub-seat, and a seat structure of the straddle-type vehicle.

Description of the Related Art

There are many types of motorcycles corresponding to users' preferences. Among them, there is a motorcycle of an American type disclosed in Japanese Laid-Open Patent Application Publication No. Hei. 10-86874. In this motorcycle, typically, a rider seat and a passenger seat are integrated.

If a vehicle can realize a configuration in which only the rider seat or both of the rider seat and the passenger seat are mountable to its vehicle body, such a configuration will become an advantage. To realize this configuration, the passenger seat may be manufactured separately from the rider seat and may be detachable from the vehicle body. However, after the passenger seat is detached from the vehicle body, a bracket used to mount the passenger seat is left on the vehicle body, or a vehicle body fastening section used to mount the passenger seat to the vehicle body is exposed, which may degrade the external appearance of the motorcycle.

In the above motorcycle, a rear fender made of metal is placed below a tandem seat, and a plurality of rubber dampers are interposed between the rear fender and a resin bottom plate member of the tandem seat. When a passenger is seated on the tandem seat, the rear fender bears a load applied to the tandem seat via the rubber dampers.

However, in a state in which the passenger is seated on the tandem seat, the bottom plate member of the tandem seat is deflected. For this reason, it is necessary to provide many rubber dampers on the upper surface of the rear fender, and increase support sections of the vehicle body, to bear the load applied to the seat. Under these circumstances, it becomes necessary to reinforce the vehicle body in many locations, and thus the weight of the vehicle body cannot be reduced.

SUMMARY OF THE INVENTION

In view of the above, an object of the present invention is to provide a vehicle which can realize a configuration in which only a rider seat or both of the rider seat and a passenger seat are mountable to a vehicle body, without degrading the external appearance of the vehicle. Another object of the present invention is to reduce the number of support sections of the vehicle body, which serve to bear a load applied to a seat.

According to a first aspect of the present invention, a straddle-type vehicle comprises a vehicle body frame; a main seat on which a rider is seated; a sub-seat on which a passenger is seated, the sub-seat being separate from the main seat and placed behind the main seat; a bracket which is separate from the main seat and to which the sub-seat is mountable; and a first fastening member which fastens the bracket to the vehicle body frame such that the bracket is detachable from the vehicle body frame, wherein the main seat includes a stay protruding rearward, and wherein the stay and the bracket are fastened together to the vehicle body frame by use of the first fastening member.

In accordance with this configuration, the bracket for the sub-seat is detachably fastened to the vehicle body frame by use of the first fastening member. In a case where the sub-seat is not mounted to the vehicle body frame, the sub-seat, which is separate from the main seat, is detached from the bracket and the bracket is detached from the vehicle body frame. As a result, the bracket is not left on the vehicle body. After the bracket for the sub-seat is detached, the stay of the main seat is fastened again to the vehicle body frame by use of the first first fastening member. Therefore, in a case where the sub-seat is not mounted to the vehicle body frame, the location where the bracket is to be fastened by the first fastening member is not exposed. As a result, it becomes possible to provide the vehicle which can realize a configuration in which only the rider seat or both of the rider seat and the passenger seat are mountable to the vehicle body frame, without degrading the external appearance of the vehicle. For example, in a case where the first fastening member is fastened to the vehicle body frame via the rear fender, it is not necessary to form in the rear fender, an opening used exclusively for fastening the bracket for the sub-seat to the vehicle body frame. This makes it possible to improve the external appearance of the vehicle in a state in which the sub-seat is not mounted to the vehicle body frame.

According to a second aspect of the present invention, a seat structure of a straddle-type vehicle comprises a seat on which a user is seated, wherein the seat includes: an outer cover member; a bottom plate member; an elastic member placed between the outer cover member and the bottom plate member; and a reinforcement member which extends along a lower surface of the bottom plate member, is fastened to the bottom plate member, and bears a load applied to the bottom plate member. In accordance with this configuration, the number of the support sections of the vehicle body, which bear the load applied to the seat, can be reduced.

The above and further objects, features, and advantages of the present invention will more fully be apparent from the following detailed description of preferred embodiment with accompanying drawings.

DETAILED DESCRIPTION OF THE EMBODIMENTS

First of all, the outline of the present embodiment will be described.

A straddle-type vehicle according to present invention comprises a vehicle body frame; a main seat on which a rider is seated; a sub-seat on which a passenger is seated, the sub-seat being separate from the main seat and placed behind the main seat; a bracket which is separate from the main seat and to which the sub-seat is mountable; and a first fastening member which fastens the bracket to the vehicle body frame such that the bracket is detachable from the vehicle body frame, wherein the main seat includes a stay protruding rearward, and wherein the stay and the bracket are fastened together to the vehicle body frame by use of the first fastening member.

The bracket may include a fitting section fitted to the stay of the main seat such that the fitting section is not angularly displaceable. In accordance with this configuration, it becomes possible to easily prevent the bracket from rotating, without a need to provide a complex rotation inhibiting mechanism, when the bracket is fastened to the vehicle body frame by use of the first fastening member.

The straddle-type vehicle may further comprise: a rear fender placed on a lower side of the sub-seat and on an upper side of the vehicle body frame, the bracket may be placed on an upper side of the rear fender, and the bracket may be detachably fastened to the vehicle body frame via the rear fender by use of the first fastening member. In accordance with this configuration, in a case where the sub-seat is not mounted to the vehicle body frame, the bracket for the sub-seat is detached from the vehicle body frame. As a result, the bracket is not left on the upper region of the rear fender. Therefore, even when the upper surface of the rear fender is exposed by detaching the sub-seat, the good external appearance of the vehicle can be maintained.

The bracket and the rear fender may be fastened together to the vehicle body frame by use of the first fastening member. In accordance with this configuration, the fastened location of the rear fender can conform to the fastened location of the bracket, and hence the external appearance of the vehicle can be improved.

The straddle-type vehicle may further comprise a second fastening member which fastens the sub-seat to the vehicle body frame such that the sub-seat is detachable from the vehicle body frame, the sub-seat may include a fastening section fastened to the vehicle body frame in a location that is distant from the bracket, and the fastening section and the rear fender may be fastened together to the vehicle body frame, by use of the second fastening member. In accordance with this configuration, the fastened location of the rear fender can conform to the fastened location of the sub-seat, and hence the external appearance of the vehicle can be improved.

The sub-seat may include as an engagement section which is engageable with the bracket, the bracket may include a vehicle body fastening section fastened to the vehicle body frame in a location that is rearward relative to the main seat, and an engaged section placed above the vehicle body fastening section, the engaged section being engageable with the engagement section of the sub-seat to inhibit a vertical displacement of the sub-seat, and the engaged section may be positioned in front of the vehicle body fastening section. In according to this configuration, the front end portion of the sub-seat can be placed easily to overlap with the rear end portion of the main seat, from above.

The bracket may include a vehicle body fastening section fastened to the vehicle body frame in a location that is rearward relative to the main seat, and a receiver section supporting the sub-seat from below, and the receiver section may be placed above the vehicle body fastening section. In accordance with this configuration, it becomes possible to prevent a contact between the receiver section of the bracket and a member located below the receiver section. Thus, damages to the member due to the contact with the bracket can be prevented.

A seat structure of a straddle-type vehicle, according to the embodiment, comprises a seat on which a user is seated, wherein the seat includes: an outer cover member; a bottom plate member; an elastic member placed between the outer cover member and the bottom plate member; and a reinforcement member which extends along a lower surface of the bottom plate member, is fastened to the bottom plate member, and bears a load applied to the bottom plate member.

The seat structure of the straddle-type vehicle may further comprise a vehicle body frame including a plurality of vehicle body support sections for supporting the seat, the plurality of vehicle body support sections being spaced apart from each other in a forward and rearward direction, the reinforcement member may include an intermediate section between the plurality of vehicle body support sections, the intermediate section facing the bottom plate member from below. In accordance with this configuration, since the intermediate section of the reinforcement member can prevent the deformation of the bottom plate member, when a load is applied to the seat and thereby the bottom plate member would otherwise be deformed, the number of support sections of the vehicle body can be reduced. The intermediate section of the reinforcement member may contact the bottom plate member in plural locations at a pitch that is smaller than a spacing between the plurality of vehicle body support sections in the forward and rearward direction. Or, the entire of the intermediate section of the reinforcement member in the forward and rearward direction may contact the bottom plate member. Or, the intermediate section of the reinforcement member may face the bottom plate member, forming a small spacing with the bottom plate member The reinforcement member may extend over a region between the plurality of vehicle body support sections. In accordance with this configuration, since a load is transmitted from the bottom plate member to the vehicle body frame via the reinforcement member, the deflection of the reinforcement member can be suppressed.

The intermediate section of the reinforcement member may be placed to be vertically spaced apart from a vehicle body member located below the intermediate section and facing the intermediate section. In accordance with this configuration, it becomes possible to prevent a situation in which the reinforcement member is pressed against the vehicle body member located below the intermediate section of the reinforcement member and facing the intermediate section, even when the intermediate section of the reinforcement member is deflected to some extent. Therefore, the damages to the upper surface of the vehicle body member can be prevented.

The vehicle body member may be a rear fender which faces the reinforcement member from below, and is placed above the vehicle body frame, the vehicle body frame may include a pair of rail members extending in the forward and rearward direction to be spaced apart from each other in a rightward and leftward direction, and a pair of cross members extending in the rightward and leftward direction to couple the pair of rail members to each other, the pair of cross members may be provided with the vehicle body support sections, respectively, the vehicle body frame may have a space formed between the pair of cross members, and the intermediate section of the reinforcement member may be located above the space. In accordance with this configuration, since the intermediate section of the reinforcement member serves to prevent the downward deformation of the bottom plate member, it becomes possible to prevent a situation in which the seat (the intermediate section of the reinforcement member) presses the rear fender in a downward direction. Since a situation in which the rear fender is deformed due to the load transmitted from the seat to the rear fender does not occur, the vehicle body frame need not support the rear fender in this respect. As a result, the vehicle body frame can be formed with a space, in a region corresponding to the intermediate section of the reinforcement member.

The plurality of vehicle body support sections may include a front vehicle body support section corresponding to a front portion of the seat, and a rear vehicle body support section corresponding to a rear portion of the seat, and the reinforcement member may be formed with a rib extending in the forward and rearward direction, to correspond to a region between the front vehicle body support section and the rear vehicle body support section. In accordance with this configuration, the rib extending in the forward and rearward direction can increase the stiffness of the reinforcement member, and suppress the deflection of the reinforcement member.

The bottom plate member may include a reinforcement member fastening section used to fasten the reinforcement member to the bottom plate member, the reinforcement member may include a plurality of elements which are detachably coupled to each other, and the plurality of elements may be placed to overlap with each other and fastened to each other to the reinforcement member fastening section. In accordance with this configuration, since the reinforcement member fastening section used to fasten the reinforcement member to the bottom plate member can be used to couple the plurality of elements to each other, the structure can be simplified.

The bottom plate member may include a front reinforcement member fastening section placed to correspond to a front portion of the seat, to fasten the reinforcement member, and a rear reinforcement member fastening section placed to correspond to a rear portion of the seat, to fasten the reinforcement member, the reinforcement member may include a first element fastened to the front reinforcement member fastening section, and a second element fastened to the rear reinforcement member fastening section, protruding rearward from a rear end portion of the seat, and fastened to the vehicle body frame, and the first element and the second element may be placed to overlap with each other and fastened together to the rear reinforcement member fastening section. In accordance with this configuration, the second element protruding farther rearward than the rear end portion of the seat does and fastened to the vehicle body frame can be manufactured separately from the first element placed between the front reinforcement member fastening section and the rear reinforcement member fastening section. In this way, these elements can be manufactured easily and accurately.

The seat may further include a belt to be gripped by the user, the bottom plate member includes a belt fastening section for fastening the belt, and the reinforcement member and the belt may be fastened together to the belt fastening section. In accordance with this configuration, the fastened location of the belt and the fastened location of the reinforcement member can conform to each other, and thus the number of fastening sections can be reduced.

Hereinafter, the embodiment of the present invention will be described with reference to the drawings. Throughout the drawings, the same or corresponding components are designated by the same reference symbols, and will not be described repeatedly. The stated directions are from the perspective of a rider straddling a motorcycle. A vehicle width direction corresponds with a rightward and leftward direction.

Figure 1:
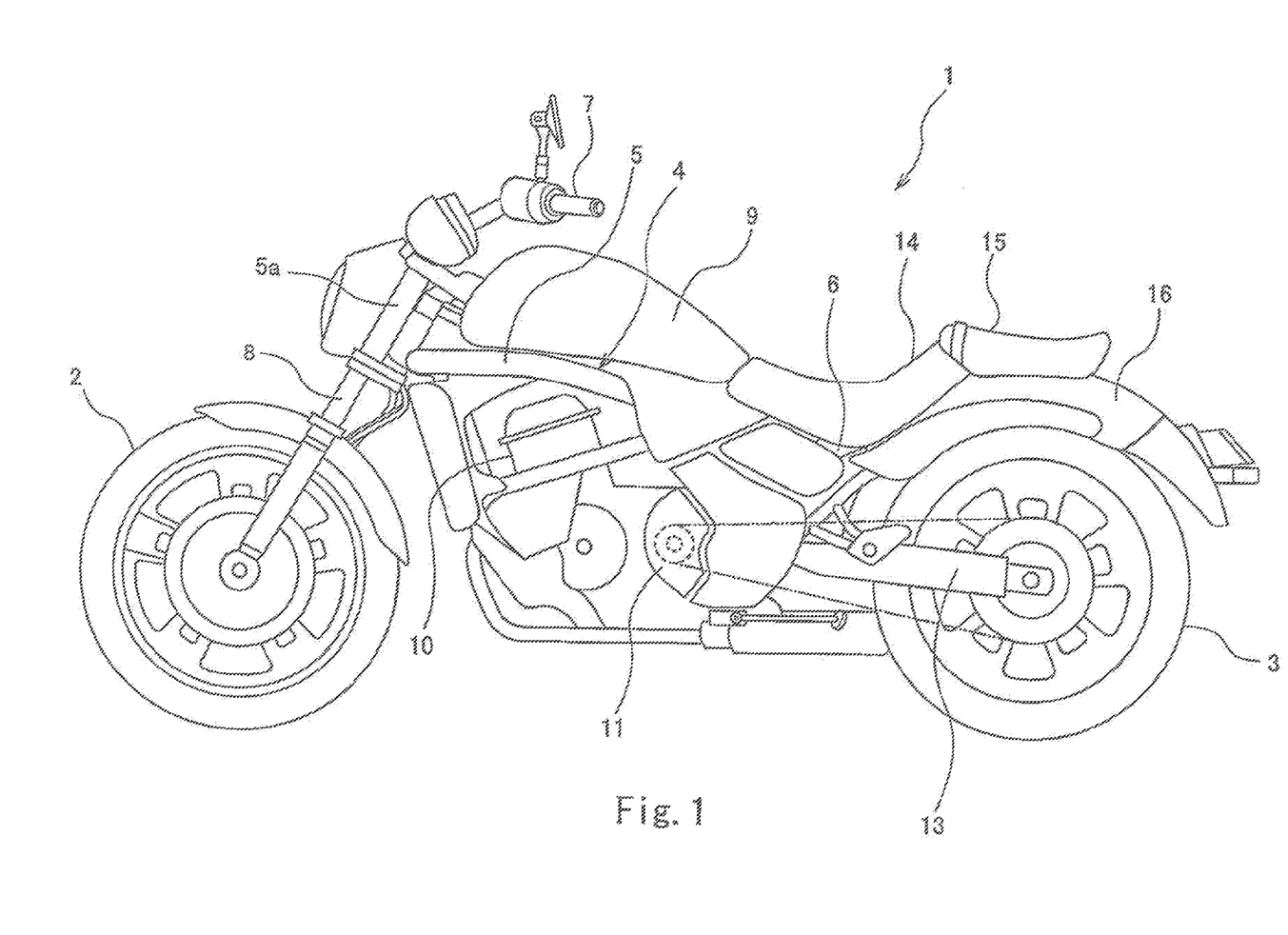
FIG. 1 is a left side view of a motorcycle according to an embodiment.

FIG. 1 is a left side view of a motorcycle 1 according to the embodiment. As shown in FIG. 1, the motorcycle 1 is a motorcycle of an American type. The motorcycle 1 includes a front wheel 2 which is a driven wheel, a rear wheel 3 which is a drive wheel, and a vehicle body frame 4 made of metal. The vehicle body frame 4 includes a front frame unit 5, and a rear frame unit 6 extending rearward from the front frame unit 5. A steering shaft (not shown) is coupled to the handle 7 and rotatably inserted into a head pipe 5a of the front frame unit 5. The front wheel 2 is rotatably supported by a front fork 8 coupled to the steering shaft.

A fuel tank 9 is placed above the front frame unit 5. An engine 10 (motor) for generating driving power for driving the rear wheel 3 is mounted to the front frame unit 5. A transmission 11 is coupled to the engine 10. The driving power output from the transmission 11 is transmitted to the rear wheel 3 via a driving power transmission mechanism 12 (e.g., an endless chain or a belt). The front end portion of a swing arm 13 extending in a forward and rearward direction is mounted to the vehicle body frame 4 such that the swing arm 13 is pivotable. The rear end portion of the swing arm 13 supports the rear wheel 3 such that the swing arm 13 is rotatable.

The rear frame unit 6 supports a main seat 14 placed behind the fuel tank 9 and a sub-seat 15 (tandem seat) placed behind the main seat 14. The sub-seat 15 is separate from the main seat 14. The rider is seated on the main seat 14, while a passenger is seated on the sub-seat 15. The rear portion of the rear frame unit 6 supports the lower portion of a rear fender 16 made of a resin, covering the rear wheel 3 from above. The rear fender 16 has a circular-arc shape protruding upward when viewed from the side. The rear fender 16 has a circular-arc shape protruding upward in a cross-section which is taken along a direction perpendicular to the forward and rearward direction. The rear fender 16 covers the upper end portion of the rear wheel 3 when viewed from a side.

The rear fender 16 is placed on the lower side the sub-seat 15 and on the upper side of the rear frame unit 6.

Figure 2A:
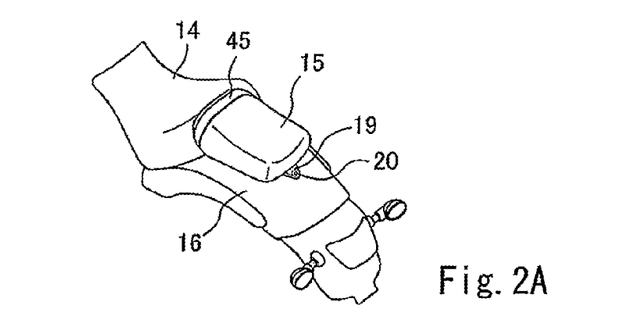
FIG. 2A is a perspective view of a sub-seat of the motorcycle of FIG. 1 and a region which is in the vicinity of the sub-seat.
Figure 2B:
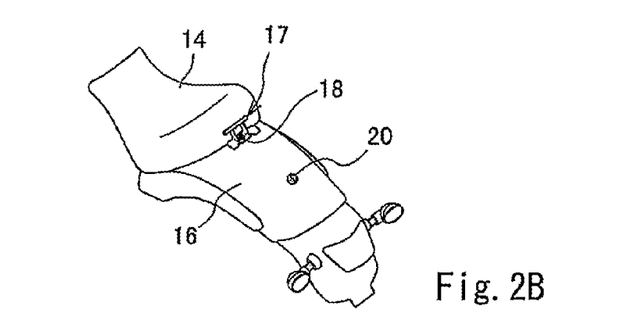
FIG. 2B is a perspective view showing a state in which the sub-seat of the motorcycle of FIG. 2A is detached.
Figure 2C:
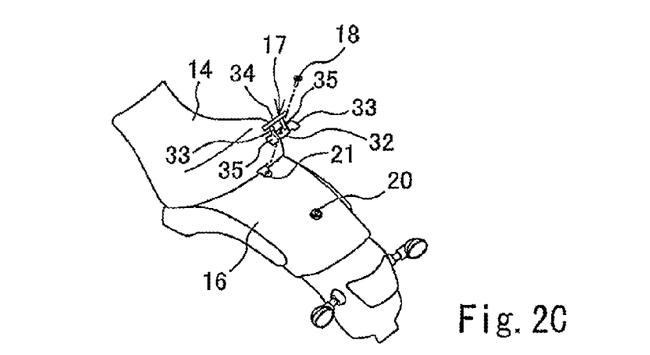
FIG. 2C is an exploded perspective view of the motorcycle of FIG. 2B.
Figure 2D:
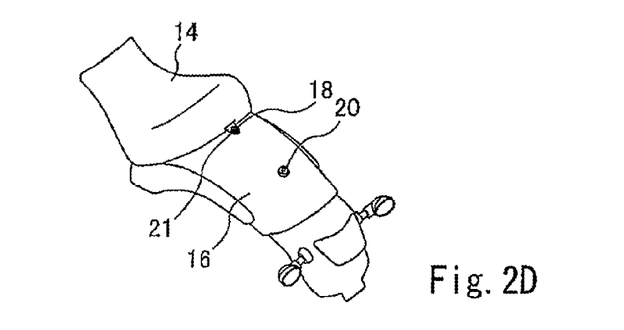
FIG. 2D is a perspective view showing a state in which a bracket of the motorcycle of FIG. 2C is detached.

FIG. 2A is a perspective view of the sub-seat 15 of the motorcycle 1 of FIG. 1 and a region which is in the vicinity of the sub-seat 15. FIG. 2B is a perspective view showing a state in which the sub-seat 15 of the motorcycle 1 of FIG. 2A is detached. FIG. 2C is an exploded perspective view of the motorcycle 1 of FIG. 2B. FIG. 2D is a perspective view showing a state in which a bracket 17 of the motorcycle 1 of FIG. 2C is detached. As shown in FIGS. 2A and 2B, the sub-seat 15 is placed on the upper side of the rear fender 16 in such a manner that the front portion of the sub-seat 15 overlaps with the rear portion of the main seat 14. The front portion of the sub-seat 15 is disengageably engaged with a bracket 17 including an engaged section 34 which will be described later. The rear portion of the sub-seat 15 is detachably fastened to the vehicle body frame 4 via the rear fender 16. The bracket 17 is separate from the main seat 14 and is placed on the upper side of the rear fender 16. The bracket 17 is detachably fastened to the vehicle body frame 4 via the rear fender 16 by use of a first fastening member 18 (e.g., bolt). A stay 19 protrudes rearward from the rear portion of the sub-seat 15. The stay 19 is detachably fastened to the vehicle body frame 4 via the rear fender 16 by use of a second fastening member 20 (e.g., bolt). In other words, the stay 19 of the sub-seat 15 is a fastening section fastened to the vehicle body frame 4 in a location that is distant from the bracket 17 in the forward and rearward direction.

When a state in which both of the main seat 14 and the sub-seat 15 are mounted to the vehicle body frame 4 is changed into a state in which only the main seat 14 is mounted to the vehicle body frame 4, initially, as shown in FIGS. 2A and 2B, the second fastening member 20 is detached and then the sub-seat 15 is moved rearward to be disengaged from the bracket 17, thereby detaching the sub-seat 15. Then, the second fastening member 20 is inserted through the rear fender 16 and fastened to the vehicle body frame 4 again. Then, as shown in FIG. 2C, the first fastening member 18 is detached and the bracket 17 is detached. After the bracket 17 is detached, a stay 21 of the main seat 14 which is fastened to the vehicle body frame 4 together with the bracket 17 by the first fastening member 18 is exposed. Then, as shown in FIG. 2D, the stay 21 of the main seat 14 is fastened to the vehicle body frame 4 via the rear fender 16 by use of the first fastening member 18. In the above-described manner, changing of the state in which both of the main seat 14 and the sub-seat 15 are mounted to the vehicle body frame 4 into the state in which only the main seat 14 is mounted to the vehicle body frame 4, is completed.

Figure 3:
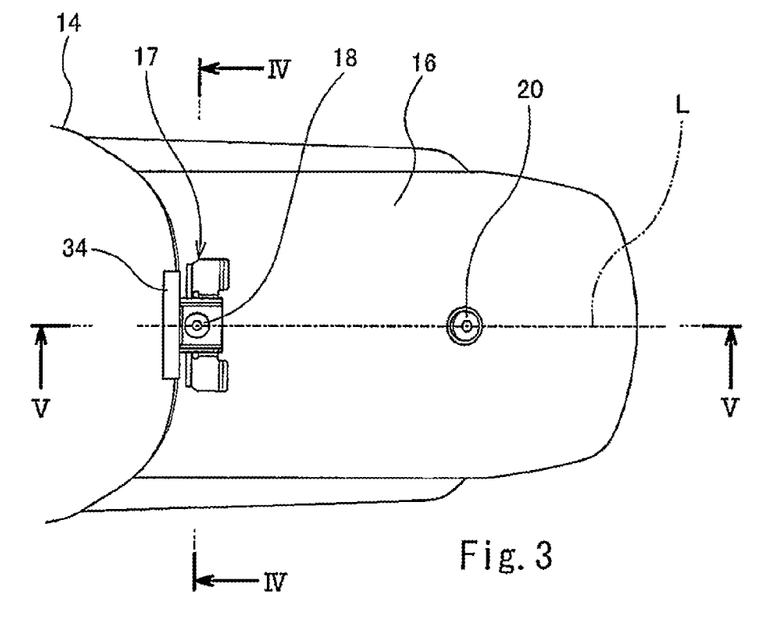
FIG. 3 is a plan view showing the major components of the motorcycle of FIG. 2B.
Figure 4:
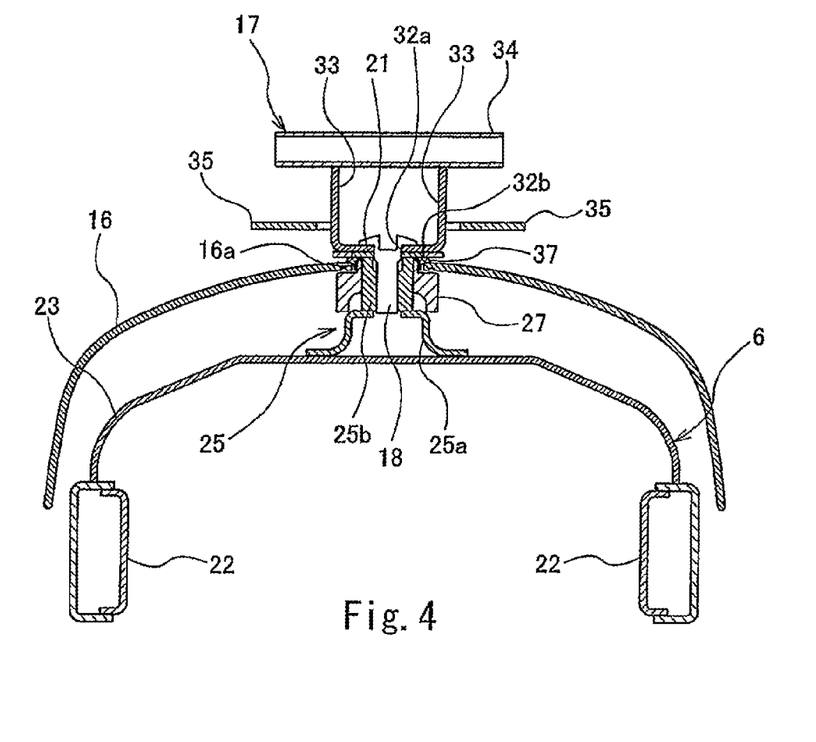
FIG. 4 is a cross-sectional view taken along IV-IV of FIG. 3.
Figure 5:
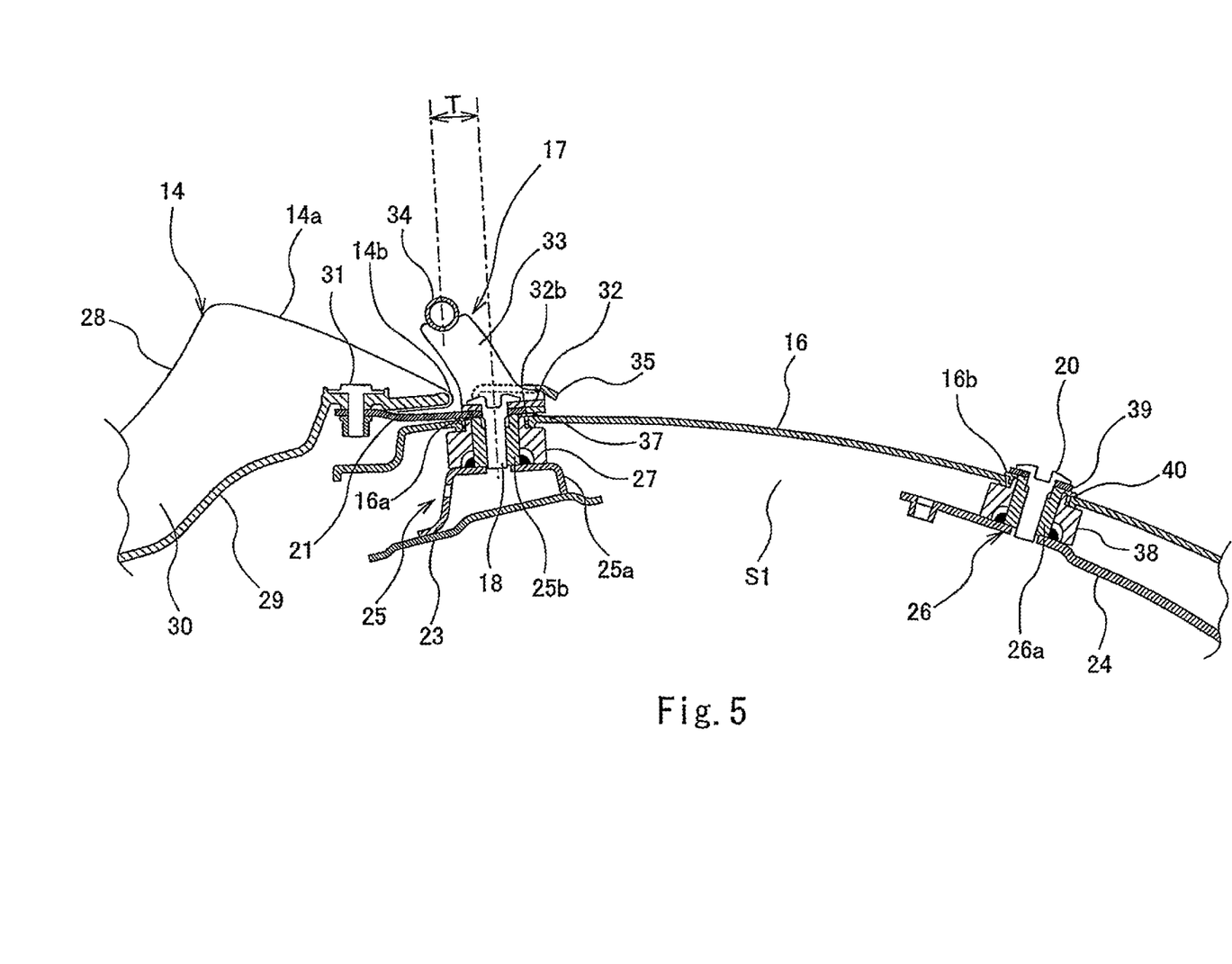
FIG. 5 is a cross-sectional view taken along V-V of FIG. 3.

FIG. 3 is a plan view showing the major components of the motorcycle 1 of FIG. 2B. FIG. 4 is a cross-sectional view taken along IV-IV of FIG. 3. FIG. 5 is a cross-sectional view taken along V-V of FIG. 3. As shown in FIGS. 3 to 5, the rear frame unit 6 of the vehicle body frame 4 includes a pair of right and left rail members 22 extending in the forward and rearward direction to be spaced apart from each other in the rightward and leftward direction, a front cross member 23 extending in the rightward and leftward direction and coupling the pair of rail members 22 to each other, and a rear cross member 24 extending in the rightward and leftward direction and coupling the pair of rail members 22 to each other. Each of the front cross member 23 and the rear cross member 24 has a circular-arc shape protruding upward, when viewed from the forward and rearward direction. The front cross member 23 and the rear cross member 24 are spaced apart from each other in the forward and rearward direction. A space S1 is formed between the front cross member 23 and the rear cross member 24. The front cross member 23 is provided with one vehicle body support section 25 located at the center of the rear frame unit 6 in the forward and rearward direction. The rear cross member 24 is also provided with one vehicle body support section 26 located at the center of the rear frame unit 6 in the vehicle width direction. The front vehicle body support section 25 corresponds to the front portion of the sub-seat 15, while the rear vehicle body support section 26 corresponds to the rear portion of the sub-seat 15.

The front vehicle body support section 25 includes a dome portion 25a fastened to the upper surface of the front cross member 23 and protruding upward, and a nut 25b fastened to the upper surface of the dome portion 25a. The nut 25b has a cylindrical shape. The inner peripheral surface of the nut 25b is formed with a female thread. A cylindrical rubber damper 27 is externally fitted to the nut 25b. The rear fender 16 is formed with a front opening 16a through which the nut 25b is exposed when viewed from above. The rubber damper 27 elastically supports the peripheral edge portion of the front opening 16a of the rear fender 16, from below.

The main seat 14 includes an outer cover member 28 made of leather, a bottom plate member 29 made of a resin, an elastic member 30 which is made of urethane, and disposed between the outer cover member 28 and the bottom plate member 29, and the stay 21 made of metal, is fastened to the rear portion of the bottom plate member 29 by use of a fastening member 31 (e.g., bolt and nut), and protrudes farther rearward than the outer cover member 28 and the bottom plate member 29 do. A portion of the stay 21, the portion protruding farther rearward than the bottom plate member 29 does, is a plate section having a taper shape with a dimension reduced in a rearward direction (see FIG. 2C). The stay 21 is formed with a fastening hole 21a.

The bracket 17 for the sub-seat 15 includes a vehicle body fastening section 32 fastened to the front vehicle body support section 25 in a location that is rearward relative to the main seat 14, a pair of side walls 33 protruding forward and upward from the right and left ends of the vehicle body fastening section 32, an engaged section 34 fastened to the upper ends of the pair of side walls 33 and extending in the vehicle width direction, and a pair of receiver sections 35 protruding outward in the vehicle width direction from the pair of side walls 33, respectively. The vehicle body fastening section 32 is formed with a fastening hole 32a. The vehicle body fastening section 32 includes a fitting section 32b fitted to the stay 21 of the main seat 14 such that the fitting section 32b is not angularly displaceable, when viewed from above. The fitting section 32b is a recess formed by recessing in an upward direction the lower surface of the vehicle body fastening section 32. The fitting section 32b is opened forward. The fitting section 32b conforms in shape to the contour of the stay 21 of the main seat 14.

The pair of side walls 33 are located on the right and left sides relative to the fastening hole 32a, when viewed from above. The engaged section 34 couples in the vehicle width direction the upper ends of the pair of side walls 33. The engaged section 34 protrudes farther outward in the vehicle width direction than the pair of side walls 33 do. The engaged section 34 has a pipe shape. The engaged section 34 is placed above the vehicle body fastening section 32, and is engageable with an engagement section 42d (described later) of the sub-seat 15. The engaged section 34 is positioned in front of the vehicle body fastening section 32. The main seat 14 has a rear end surface 14a inclined in a forward direction from a lower side to an upper side. The bracket 17 overlaps with the rear end surface 14a of the main seat 14, when viewed from above. The engaged section 34 is positioned in front of the rear end 14b of the main seat 14. The engaged section 34 is placed rearward to be spaced apart from the rear end surface 14a of the main seat 14. The receiver sections 35 are placed above the vehicle body fastening section 32 and below the engaged section 34. The receiver sections 35 serve to support the sub-seat 15 from below.

In a state in which the fitting section 32b of the bracket 17 is fitted to the stay 21 of the main seat 14, from above, the first fastening member 18 is inserted into the hole 21a of the stay 21 and the hole 32a of the bracket 17 and fastened to the nut 25b. In this way, the first fastening member 18 is inserted into the front opening 16a of the rear fender 16 to detachably fasten the bracket 17 and the stay 21 to the front vehicle body support section 25. A ring-shaped cap 37 is located on the outer peripheral side of the upper end portion of the nut 25b and interposed between the stay 21 and the rear fender 16. The cap 37 is made of a resin which is more flexible than the resin of the rear fender 16. The first fastening member 18 serves to fasten the bracket 17, the stay 21 of the main seat 14, and the rear fender 16 together to the rear frame unit 6. The first fastening member 18 is placed so as not to overlap with the engaged section 34 when viewed from above. More specifically, when viewed from above, the engaged section 34 is placed in front at a distance of T from the first fastening member 18, and thus, the first fastening member 18 is exposed. The first fastening member 18 and the engaged section 34 are placed at the center of the rear fender 16 in the vehicle width direction, and on a vehicle body center line L extending in the forward and rearward direction, when viewed from above.

The rear vehicle body support section 26 includes a nut 26a fastened to the upper surface of the rear cross member 24. The nut 26a has a cylindrical shape. The inner peripheral surface of the nut 26a is formed with a female thread. A cylindrical rubber damper 38 is externally fitted to the nut 26a. The rear fender 16 is formed with a rear opening 16b through which the nut 26a is exposed, when viewed from above. The rubber damper 38 elastically supports the peripheral edge portion of the rear opening 16b of the rear fender 16, from below.

In a state in which the sub-seat 15 is detached, the second fastening member 20 is fastened to the nut 26a via a washer 39. A ring-shaped cap 40 is located on the outer peripheral side of the upper end portion of the nut 26a and interposed between the washer 39 and the rear fender 16. The cap 40 is made of a resin which is more flexible than the resin of the rear fender 16. In this way, the second fastening member 20 is inserted into the rear opening 16b of the rear fender 16 and detachably fastened to the rear vehicle body support section 26.

Figure 6:
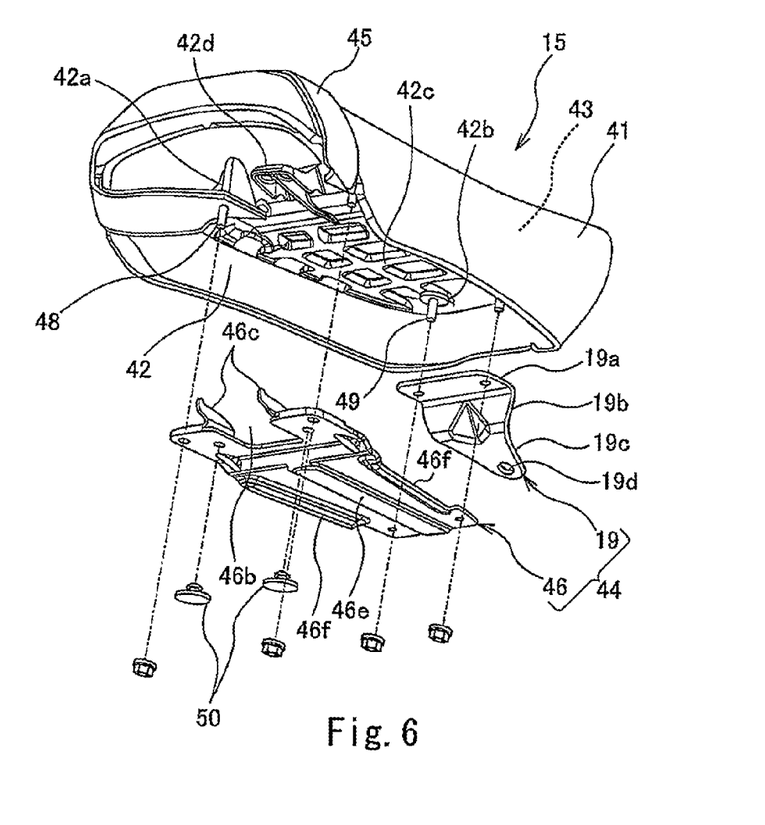
FIG. 6 is an exploded perspective view of the sub-seat of the motorcycle of FIG. 2A, when viewed from below.
Figure 7:
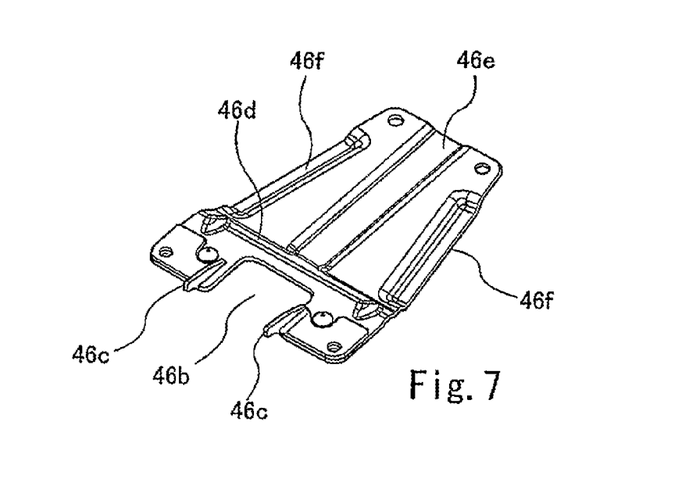
FIG. 7 is a perspective view of the reinforcement member body of the sub-seat of FIG. 6, when viewed from above.

FIG. 6 is an exploded perspective view of the sub-seat 15 of the motorcycle 1 of FIG. 2A, when viewed from below. FIG. 7 is a perspective view of a reinforcement member body 46 of the sub-seat 15 of FIG. 6, when viewed from above. As shown in FIGS. 6 and 7, the sub-seat 15 includes an outer cover member 41 made of leather, a bottom plate member 42 made of a resin, an elastic member 43 which is made of urethane and placed between the outer cover member 41 and the bottom plate member 42, a reinforcement member 44 fastened to the bottom plate member 42 and extending along the lower surface of the bottom plate member 42, and a belt 45 which is made of leather and gripped by a user. The dimension of the sub-seat 15 in the forward and rearward direction is larger than the dimension of the sub-seat 15 in the vehicle width direction.

The outer cover member 41 is secured to the bottom plate member 42 by use of a stapler. The bottom plate member 42 has a cross-section recessed upward. The bottom plate member 42 includes a pair of right and left front reinforcement member fastening sections 42a corresponding to the front portion of the sub-seat 15, and a pair of right and left rear reinforcement member fastening sections 42b corresponding to the rear portion of the sub-seat 15. The front reinforcement member fastening sections 42a also serve as a belt fastening section for fastening the belt 45. An intermediate section 42c of the bottom plate member 42 is located between the front reinforcement member fastening sections 42a and the rear reinforcement member fastening sections 42b. The intermediate section 42c is formed with a plurality of concave-convex portions. The bottom plate member 42 includes the engagement section 42d engaged with the engaged section 34 of the bracket 17. The engagement section 42d protrudes forward and is placed on the front portion of the bottom plate member 42 in a location that is rearward relative to the front end of the sub-seat 15.

The reinforcement member 44 includes a first element 46 and a second element 19 which are detachably coupled to each other. Each of the first element 46 and the second element 19 is manufactured by press-forming a metal plate. The first element 46 has a dimension in the forward and rearward direction that is larger than that of the second element 19. The first element 46 has a dimension in the vehicle width direction that is larger than that of the second element 19. Hereinafter, the first element 46 will be referred to as the reinforcement member body 46, and the second element 19 will be referred to as the stay 19.

The reinforcement member body 46 is fastened to the front reinforcement member fastening sections 42a by use of fastening members 48 (e.g., bolts and nuts), and to the rear reinforcement member fastening sections 42b by use of fastening members 49 (e.g., bolts and nuts). The belt 45 and the reinforcement member body 46 are fastened together to the front reinforcement member fastening sections 42a, by use of the fastening members 48. The stay 19 is fastened to the rear reinforcement member fastening sections 42b. In addition, the stay 19 protrudes farther rearward than the rear end of the bottom plate member 42 of the sub-seat 15 does, and is fastened to the rear vehicle body support section 26 of the rear frame unit 6. The reinforcement member body 46 and the stay 19 are placed to overlap with each other and fastened together to the rear reinforcement member fastening sections 42b, by use of the fastening members 49. Since the reinforcement member 44 includes the elements 46, 19 coupled to each other, an increase in the size of the reinforcement member 44 corresponding to each manufacturing unit can be prevented, and non-uniformity of dimension accuracy due to springback or the like can be prevented.

The reinforcement member 44 extends in the forward and rearward direction from the front side of the sub-seat 15 to the rear side of the sub-seat 15. The dimension of the reinforcement member 44 in the forward and rearward direction is larger than the dimension of the reinforcement member 44 in the vehicle width direction. The dimension of the reinforcement member 44 in the vehicle width direction is smaller than that of the bottom plate member 42. Since the vehicle body support sections 25, 26 (see FIG. 5) of the rear frame unit 6 are placed at the center of the sub-seat 15 in the vehicle width direction, an increase in the dimension of the reinforcement member 44 in the vehicle width direction can be prevented.

The reinforcement member 44 includes an intermediate section 44a which is located between the front vehicle body support section 25 and the rear vehicle body support section 26, and faces the bottom plate member 42 from below. Specifically, the reinforcement member body 46 located at a lower side faces and contacts the intermediate section 42c of the bottom plate member 42 located at an upper side. The center portion in the vehicle width direction, of the front end portion of the reinforcement member body 46 is formed with a hollow space 46b formed by cutting out a portion from the front end portion, in a rearward direction. The front end portion of the reinforcement member body 46 is provided with a pair of protrusions 46c protruding upward, on both sides in the vehicle width direction relative to the hollow space 46b. Rubber dampers 50 are attached to the lower surface of the front end portion of the reinforcement member body 46, on both sides in the vehicle width direction relative to the hollow space 46b. The reinforcement member body 46 includes a stepped portion 46d extending in the vehicle width direction, in front of the center of the reinforcement member body 46 in the forward and rearward direction. In the reinforcement member body 46, the front portion of the stepped portion 46d is located above the rear portion of the stepped portion 46d.

The reinforcement member body 46 is provided with a plurality of ribs 46e, 46f extending in the forward and rearward direction to correspond to a region between the front vehicle body support section 25 and the rear vehicle body support section 26. The ribs 46e, 46f are manufactured by press-forming such that the ribs 46e, 46f protrude downward. The rib 46e is provided on the center portion of the reinforcement member body 46 in the vehicle width direction, and extends from the stepped portion 46d to the rear end of the reinforcement member body 46. The ribs 46f are provided on the both ends of the reinforcement member body 46 in the vehicle width direction and extend rearward from the stepped portion 46d. The length of the ribs 46f in the forward and rearward direction is smaller than that of the rib 46e.

The stay 19 includes a joint section 19a fastened to the rear reinforcement member fastening sections 42b, an intermediate section 19b extending downward and rearward from the joint section 19a, and a fastening section 19c which protrudes from the intermediate section 19b to be farther rearward than the rear end of the bottom plate member 42 does and is formed with a fastening hole 19d. The fastening section 19c of the stay 19 has a taper shape with a dimension reduced in the rearward direction (see FIG. 2A).

Figure 8:
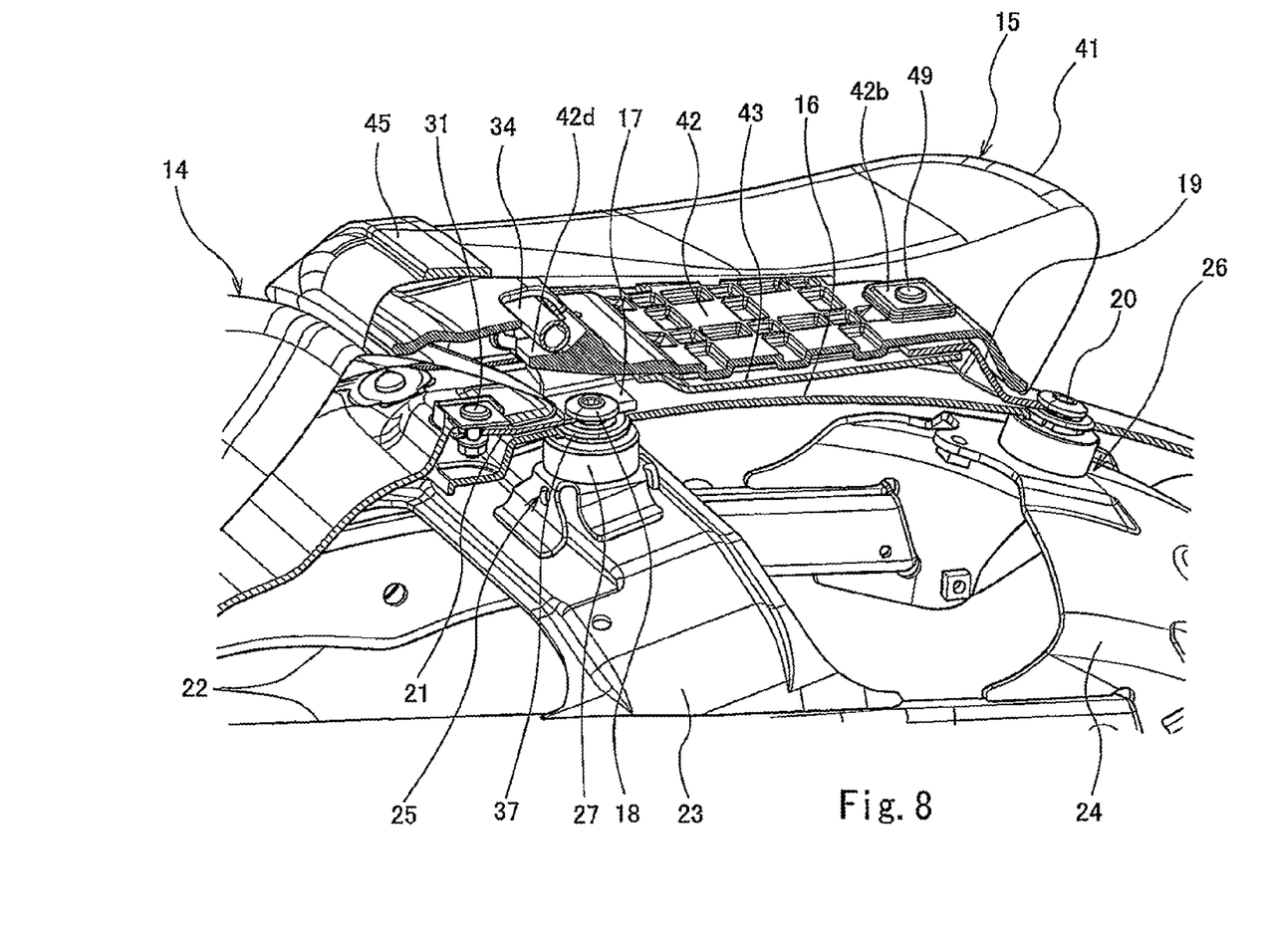
FIG. 8 is a perspective view showing the major components of FIG. 2A, when viewed from the left and the front, a part of which is in cross-section.
Figure 9:
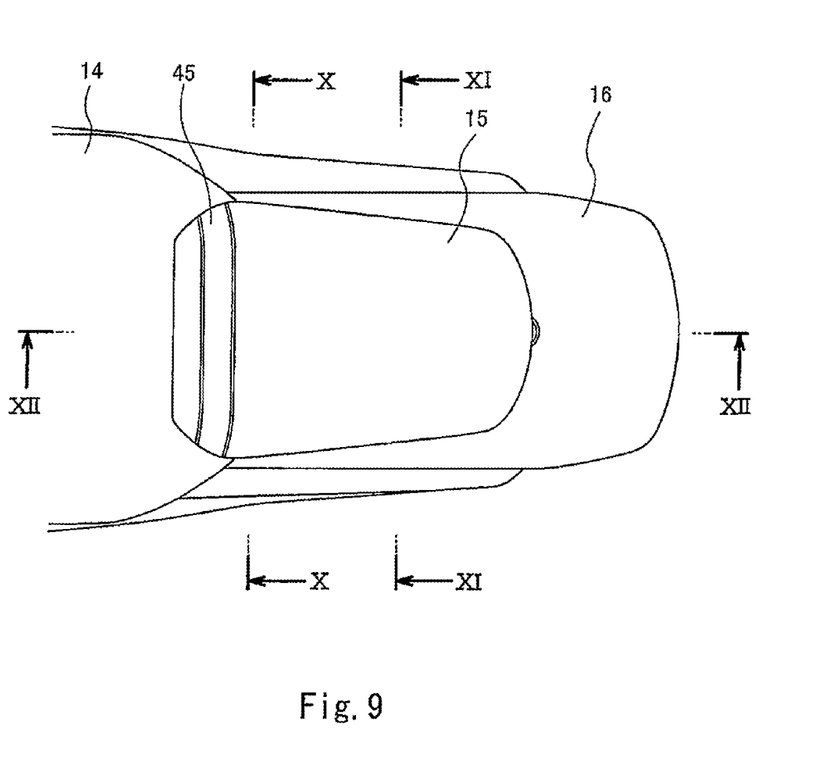
FIG. 9 is a plan view showing the major components of the motorcycle of FIG. 2A.
Figure 10:
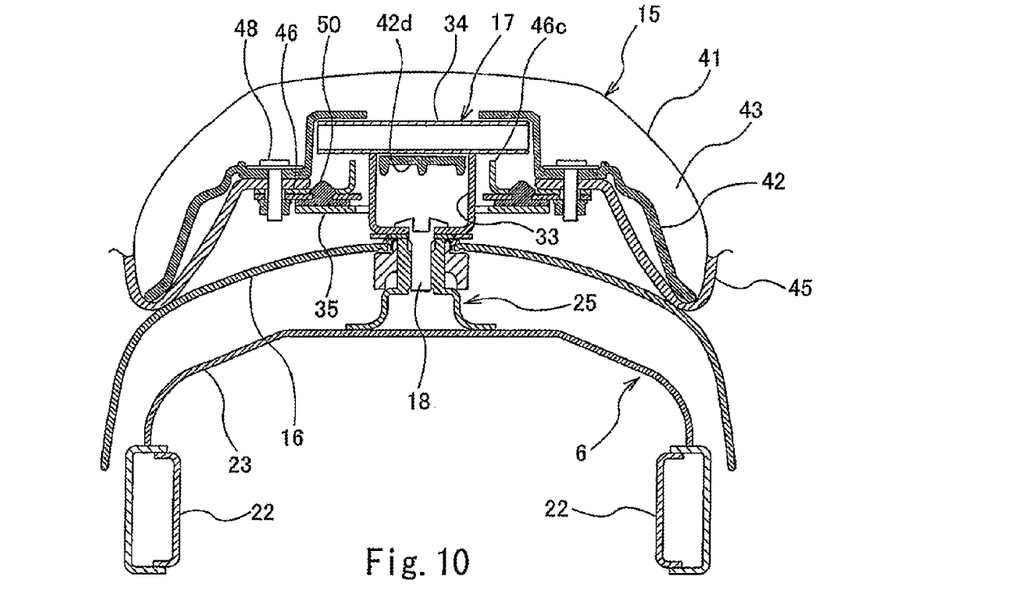
FIG. 10 is a cross-sectional view taken along X-X of FIG. 9.
Figure 11:
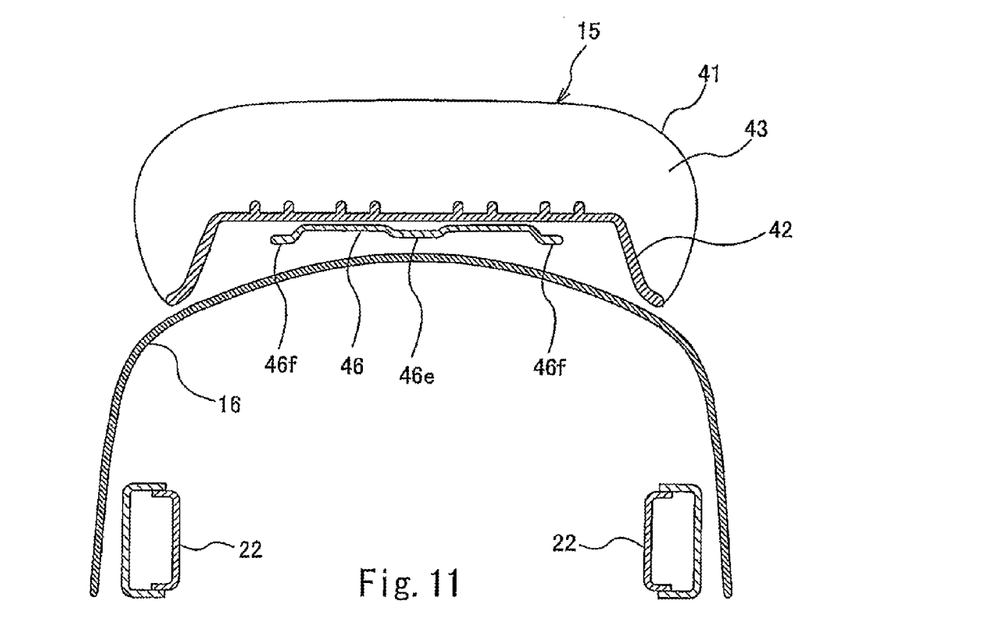
FIG. 11 is a cross-sectional view taken along XI-XI of FIG. 9.
Figure 12:
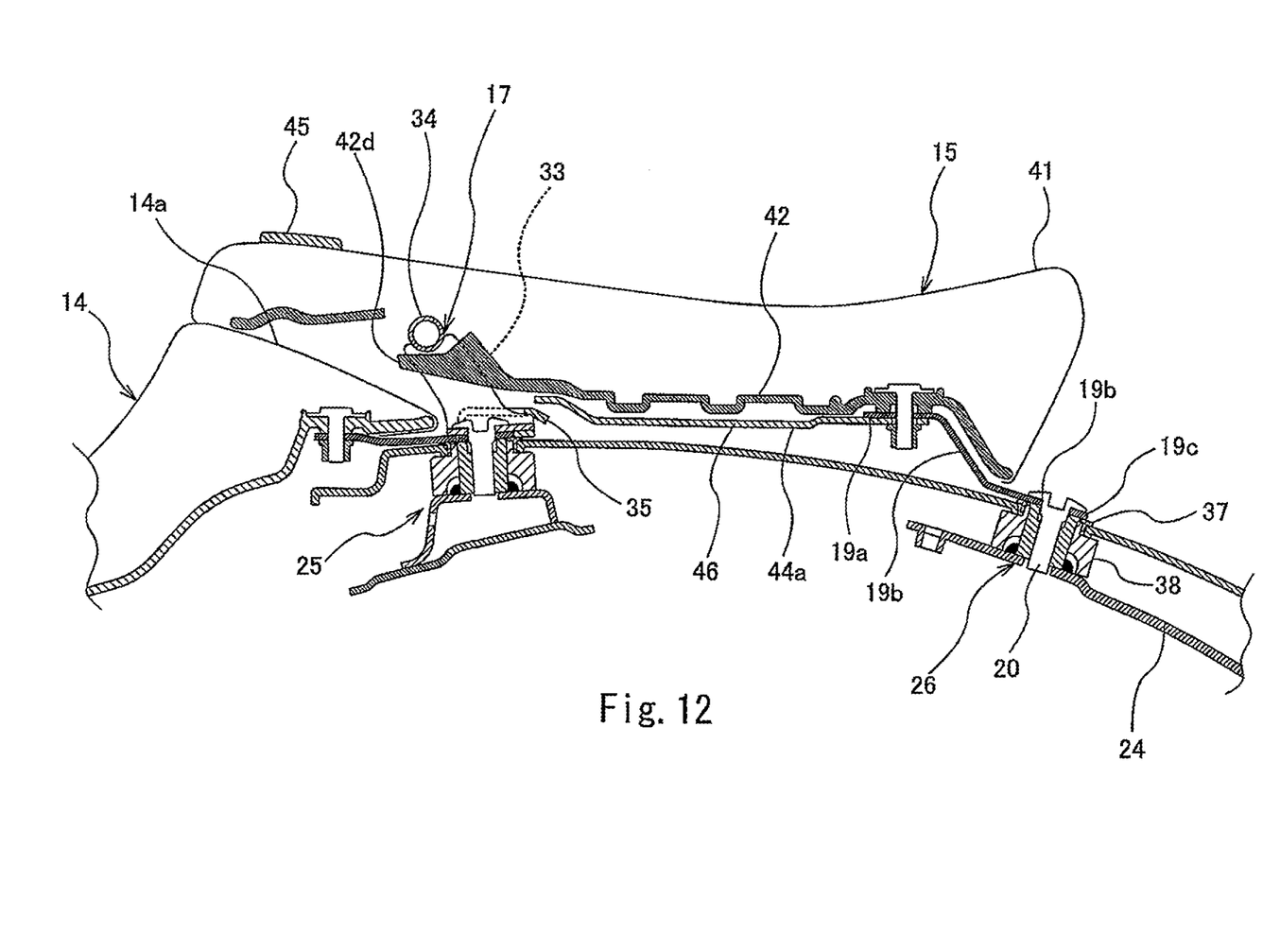
FIG. 12 is a cross-sectional view taken along XII-XII of FIG. 9.

FIG. 8 is a perspective view showing the major components of the motorcycle 1 of FIG. 2A, when viewed from the left and the front, a part of which is in cross-section. FIG. 9 is a plan view showing the major components of the motorcycle 1 of FIG. 2A. FIG. 10 is a cross-sectional view taken along X-X of FIG. 9. FIG. 11 is a cross-sectional view taken along XI-XI of FIG. 9. FIG. 12 is a cross-sectional view taken along XII-XII of FIG. 9. As shown in FIGS. 8 to 12, in a state in which the sub-seat 15 is mounted to the vehicle body, in the seat structure of the present embodiment, the front end portion of the sub-seat 15 is placed to overlap with the rear end surface 14a of the main seat 14 from above, the rear end surface 14a being inclined forward. The engagement section 42d of the sub-seat 15 is engaged with the engaged section 34 of the bracket 17. The stay 19 of the sub-seat 15 is fastened to the rear vehicle body support section 26 by use of the second fastening member 20.

More specifically, the engagement section 42d of the sub-seat 15 is inserted into a space formed below the engaged section 34 of the bracket 17 and between the pair of side walls 33, from the rear, so that the bracket 17 is placed into the hollow space 46b of the reinforcement member body 46. Since the engagement section 42d contacts the engaged section 34, the upward displacement of the sub-seat 15 can be inhibited. In addition, since the engagement section 42d contacts the side walls 33, the displacement of the sub-seat 15 in the rightward and leftward direction can be inhibited. The protrusions 46c of the reinforcement member 44 face the engaged section 34 from below, in locations that are outward in the vehicle width direction relative to the pair of side walls 33, respectively. When the belt 45 is pulled such that the sub-seat 15 is would otherwise be moved upward, the protrusions 46c of the reinforcement member 44 contact the engaged section 34. In this way, the upward displacement of the sub-seat 15 is surely inhibited. The engaged section 34 of the bracket 17 faces the lower surface of the bottom plate member 42 of the sub-seat 15, and therefore serves to support the bottom plate member 42 from below. The front end portion of the reinforcement member body 46 of the sub-seat 15 is placed from above onto the receiver sections 35 of the bracket 17 via the rubber dampers 50 attached to the lower surface of the front end portion of the reinforcement member body 46.

The second fastening member 20 is inserted into the hole 19d of the fastening section 19c of the stay 19 of the sub-seat 15 and fastened to the nut 26a. Thus, the second fastening member 20 is inserted into the rear opening 16b of the rear fender 16 and fastens the stay 19 and the rear fender 16 to the rear vehicle body support section 26 such that the stay 19 and the rear fender 16 are detachable. In this fastening operation, the engagement section 42d of the sub-seat 15 contacts the side walls 33 of the bracket 17, and thus the angular displacement of the sub-seat 15 around the second fastening member 20 can be prevented.

The rear fender 16 faces the reinforcement member 44 from below and faces the rear frame unit 6 from above. The reinforcement member 44 extends over a region between the front vehicle body support section 25 and the vehicle body support section 26. The reinforcement member body 46 is placed to be vertically spaced apart from the rear fender 16 located below the reinforcement member body 46. To be precise, the intermediate section 44a of the reinforcement member 44, which is located between the front vehicle body support section 25 and the rear vehicle body support section 26, is vertically spaced apart from the rear fender 16 and is not supported by the rear fender 16. In the region between the front vehicle body support section 25 and the rear vehicle body support section 26, the rear frame unit 6 does not support the rear fender 16. The intermediate section 44a of the reinforcement member 44 is located above the space S1 formed between the front cross member 23 and the rear cross member 24 of the rear frame unit 6. The right and left lower end portions of the sub-seat 15 are spaced apart from the upper surface of the rear fender 16.

In accordance with the above-described configuration, the bracket 17 for the sub-seat 15 is detachably fastened to the vehicle body frame 4 by use of the first fastening member 18. In a case where the sub-seat 15 is not mounted to the vehicle body frame 4, the sub-seat 15 which is separate from the main seat 14 is detached from the bracket 17, and the bracket 17 is detached from the vehicle body frame 4. As a result, the bracket 17 is not left on the upper region of the rear fender 16. Therefore, even when the upper surface of the rear fender 16 is exposed by detaching the sub-seat 15, the good external appearance of the vehicle can be maintained. After the bracket 17 for the sub-seat 15 is detached, the stay 21 of the main seat 14 is fastened again to the vehicle body frame 4 by use of the first fastening member 18. Therefore, in a case where the sub-seat 15 is not mounted to the vehicle body frame 4, the location which is to be fastened by the first fastening member 18 is not exposed. In addition, it is not necessary to form in the rear fender 16 an opening used exclusively for fastening the bracket 17 to the vehicle body frame 4. As a result, it becomes possible to provide the vehicle which can realize a configuration in which only the rider seat or both of the rider seat and the passenger seat is/are mountable to the vehicle body frame, without degrading the external appearance of the vehicle.

The first fastening member 18 serves to fasten the bracket 17 and the rear fender 16 together to the vehicle body frame 4, while the second fastening member 20 serves to fasten the stay 19 and the rear fender 16 together to the vehicle body frame 4. In this configuration, the fastened locations of the rear fender 16 conform to the fastened location of the bracket 17 and the fastened location of the sub-seat 15, respectively, which can improve the external appearance of the vehicle. Since the bracket 17 is placed on the stay 21, it becomes possible to prevent the bracket 17 from contacting the rear fender 16, and hence prevent the rear fender 16 from being damaged by the bracket 17. The stay 21 and the first fastening member 18 are placed at the center portion of the rear fender 16 in the vehicle width direction. In other words, the stay 21 and the first fastening member 18 are placed on the uppermost portion of the rear fender 16, in a cross-section perpendicular to the forward and rearward direction. In this configuration, the bracket 17 extended horizontally when viewed from the first fastening member 18, does not contact the rear fender 16. The receiver sections 35 of the bracket 17 are placed above the vehicle body fastening section 32. Therefore, a contact between the receiver sections 35 and the rear fender 16 can be appropriately prevented, and hence damages to the upper surface of the rear fender 16 due to the contact can be prevented.

The bracket 17 includes the fitting section 32b fitted to the stay 21 of the main seat 14 such that the fitting section 32b is not angularly displaceable. The bracket 17 is fastened to the vehicle body frame 4 by use of the first fastening member 18 such that the bracket 17 is prevented from rotating, without a need to provide a complex rotation inhibiting mechanism. The rotation inhibiting mechanism (fitting section 32b) of the bracket 17 is formed with the recess concaved upward to correspond to the stay 21. This rotation inhibiting mechanism is fitted to the stay 21 and thus the bracket 17 is prevented from rotating. In a state in which the fitting section 32b of the bracket 17 is fitted to the stay 21, the displacement of the bracket 17 with respect to the stay 21 in a forward direction and in a lateral direction is inhibited. Therefore, the bracket 17 and the stay 21 can be easily fastened together to the vehicle body frame 4, by use of the first fastening member 18. Specifically, since the stay 21 has a shape having a dimension reduced in the rearward direction, the bracket 17 fitted to the stay 21 can be inhibited from being displaced in the forward direction and in the lateral direction.

The engaged section 34 of the bracket 17 is positioned in front of the vehicle body fastening section 32. Because of this layout, the front end portion of the sub-seat 15 can be easily placed to overlap with the rear end portion of the main seat 14 from above. Since the front end portion of the sub-seat 15 is placed to overlap with the rear end portion of the main seat 14 in the forward and rearward direction and in the vertical direction, the seats 14, 15 can have a unitary configuration. Therefore, the external appearance of the vehicle can be improved. In addition, since the engaged section 34 of the bracket 17 is positioned in front of the first fastening member 18, the belt 45 to be gripped, which is attached on the sub-seat 15, can be placed in a location that is as forward as possible, which can prevent an increase in the size of the sub-seat 15. Since the belt 45 is placed on a portion of the sub-seat 15, the portion overlapping with the rear end portion of the main seat 14, from above, the rear end portion of the sub-seat 15 can be made close to the main seat 14, and thus the center of gravity of the vehicle body can be made close to the center of the vehicle body. Further, it becomes possible to increase the vertical dimension of the elastic member 43 (e.g., made of urethane) placed on a portion of the sub-seat 15, on which the passenger is seated.

Since the sub-seat 15 includes the reinforcement member 44 extending along the lower surface of the bottom plate member 42 made of a resin and fastened to the bottom plate member 42, the reinforcement member 44 serves to bear the load applied to the bottom plate member 42. This makes it possible to reduce the support sections of the vehicle body, which bear the load applied to the sub-seat 15. Since the reinforcement member 44 extends over the region between the front vehicle body support section 25 and the rear vehicle body support section 26, the load is transferred from the bottom plate member 42 to the rear frame unit 6 via the reinforcement member 44. As a result, the deflection of the reinforcement member 44 can be suppressed.

The intermediate section 44a of the reinforcement member 44 is vertically spaced apart from the rear fender 16 located below the intermediate section 44a. Therefore, it becomes possible to prevent a situation in which the reinforcement member 44 is pressed against the rear fender 16, even when the intermediate section 44a of the reinforcement member 44 is deflected to some extent. Since a situation in which the rear fender 16 is deformed due to the load transmitted from the sub-seat 15 to the rear fender 16 does not occur, the rear frame unit 6 need not support the rear fender 16 in this respect. For this reason, the rear frame unit 6 can be formed with the space S1 in a region immediately below the intermediate section 44a of the reinforcement member 44, which can reduce the weight of the vehicle body. Since it becomes possible to prevent the intermediate section 44a of the reinforcement member 44 from being pressed against the rear fender 16, the rear fender 16 can be made of a resin instead of metal. This makes it possible to further reduce the weight of the vehicle body and improve the external appearance of the upper surface of the rear fender 16.

In a portion of the reinforcement member 44, the portion being located between the front vehicle body support section 25 and the rear vehicle body support section 26, a spacer (e.g., rubber damper) for spacing this portion of the reinforcement member 44 apart from the rear fender 16, does not exist. Therefore, since the spacer is not left on the upper surface of the rear fender 16, the external appearance of the upper surface of the rear fender 16 can be further improved. Further, since the reinforcement member 44 can suppress the deflection and deformation of the bottom plate member 42, it becomes possible to prevent a situation in which the right and left lower end portions of the sub-seat 15 scrape against the upper surface of the rear fender 16. As a result, the upper surface of the rear fender 16 can be further improved.

Since the reinforcement member 44 is formed with the ribs 46e, 46f extending in the forward and rearward direction, the stiffness of the reinforcement member 44 can be improved, and the deflection of the reinforcement member 44 can be suppressed. The reinforcement member body 46 and the stay 19 are coupled to each other by use of the reinforcement member fastening sections 42a used to fasten the reinforcement member 44 to the bottom plate member 42. This can simplify the structure. Since the reinforcement member 44 and the belt 45 are fastened together to the bottom plate member 42, the fastened location of the belt 45 conforms to the fastened location of the reinforcement member 44, which can reduce the number of the fastened locations.

The present invention is not limited to the above-described embodiment. The above-described configuration may be changed, added to, or deleted from, within a scope of the spirit of the preset invention. Although in the above-described embodiment, the motorcycle is exemplarily described as the straddle-type vehicle, the present invention is applicable to another vehicle (e.g., ATV) so long as the vehicle is a straddle-type vehicle provided with a seat straddled by a user. Although in the above described embodiment, the internal combustion engine is used as the motor, an electric motor may be used instead. Although the configuration of the present embodiment is suitably applicable to the motorcycle of the American type, it may be applied to a motorcycle of a racer type or a naked type.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A straddle-type vehicle comprising:
a vehicle body frame;
a main seat on which a rider is seated;
a sub-seat on which a passenger is seated, the sub-seat being separate from the main seat and placed behind the main seat;
a bracket which is separate from the main seat and to which the sub-seat is mountable;
a first fastening member which fastens the bracket to the vehicle body frame such that the bracket is detachable from the vehicle body frame; and
a rear fender placed on a lower side of the sub-seat and on an upper side of the vehicle body frame,
wherein the main seat includes a stay protruding rearward,
wherein the stay and the bracket are placed on an upper side of the rear fender, and
wherein the stay, the bracket and the rear fender are placed to overlap with each other and fastened together to the vehicle body frame by use of the first fastening member in a location that is rearward relative to the main seat.

2. The straddle-type vehicle according to claim 1,
wherein the bracket includes a fitting section fitted to the stay of the main seat such that the fitting section is not angularly displaceable.

3. The straddle-type vehicle according to claim 1, further comprising:
a second fastening member which fastens the sub-seat to the vehicle body frame such that the sub-seat is detachable from the vehicle body frame,
wherein the sub-seat includes a fastening section fastened to the vehicle body frame in a location that is distant from the bracket, and
wherein the fastening section and the rear fender are fastened together to the vehicle body frame, by use of the second fastening member.

4. The straddle-type vehicle according to claim 1,
wherein a front portion of the sub-seat includes an engagement section which is engageable with the bracket,
wherein the bracket includes a vehicle body fastening section fastened to the vehicle body frame in a location that is rearward relative to the main seat, and an engaged section placed above the vehicle body fastening section, the engaged section being engageable with the engagement section of the sub-seat to inhibit a vertical displacement of the sub-seat, and
wherein the engaged section is positioned in front of the vehicle body fastening section.

5. The straddle-type vehicle according to claim 1,
wherein the bracket includes a vehicle body fastening section fastened to the vehicle body frame in a location that is rearward relative to the main seat, and a receiver section supporting the sub-seat from below, and
wherein the receiver section is placed above the vehicle body fastening section.

6. A seat structure of a straddle-type vehicle, comprising:
a seat on which a user is seated,
wherein the seat includes:
an outer cover member;
a bottom plate member;
an elastic member placed between the outer cover member and the bottom plate member; and
a reinforcement member which extends along a lower surface of the bottom plate member, is fastened to the bottom plate member, and bears a load applied to the bottom plate member,
wherein the bottom plate member includes a reinforcement member fastening section used to fasten the reinforcement member to the bottom plate member,
wherein the reinforcement member includes a plurality of elements which are detachably coupled to each other, and
wherein the plurality of elements are placed to overlap with each other and fastened together to the reinforcement member fastening section.

7. The seat structure of the straddle-type vehicle according to claim 6, further comprising:
a vehicle body frame including a plurality of vehicle body support sections for supporting the seat, the plurality of vehicle body support sections being spaced apart from each other in a forward and rearward direction,
wherein the reinforcement member includes an intermediate section between the plurality of vehicle body support sections, the intermediate section facing the bottom plate member from below.

8. The seat structure of the straddle-type vehicle according to claim 7,
wherein the reinforcement member extends over a region between the plurality of vehicle body support sections.

9. The seat structure of the straddle-type vehicle according to claim 7,
wherein the intermediate section of the reinforcement member is placed to be vertically spaced apart from a vehicle body member located below the intermediate section and facing the intermediate section.

10. The seat structure of the straddle-type vehicle according to claim 7,
wherein the plurality of vehicle body support sections include a front vehicle body support section corresponding to a front portion of the seat, and a rear vehicle body support section corresponding to a rear portion of the seat, and wherein the reinforcement member is formed with a rib extending in the forward and rearward direction, to correspond to a region between the front vehicle body support section and the rear vehicle body support section.

11. The seat structure of the straddle-type vehicle according to claim 7,
wherein the bottom plate member includes a front reinforcement member fastening section placed to correspond to a front portion of the seat, to fasten the reinforcement member, and a rear reinforcement member fastening section placed to correspond to a rear portion of the seat, to fasten the reinforcement member,
wherein the reinforcement member includes a first element fastened to the front reinforcement member fastening section, and a second element fastened to the rear reinforcement member fastening section, protruding rearward from a rear end portion of the seat, and fastened to the vehicle body frame, and
wherein the first element and the second element are placed to overlap with each other and fastened together to the rear reinforcement member fastening section.

12. The seat structure of the straddle-type vehicle according to claim 6,
wherein the seat further includes a belt to be gripped by a user,
wherein the bottom plate member includes a belt fastening section for fastening the belt, and
wherein the reinforcement member and the belt are fastened together to the belt fastening section.

13. A seat structure of a straddle-type vehicle, comprising:
a seat on which a user is seated; and
a vehicle body frame including a plurality of vehicle body support section for supporting the seat, the plurality of vehicle body support sections being spaced apart from each other in a forward and rearward direction,
wherein the seat includes:
an outer cover member;
a bottom plate member;
an elastic member placed between the outer cover member and the bottom plate member; and
a reinforcement member which extends along a lower surface of the bottom plate member, is fastened to the bottom plate member, and bears a load applied to the bottom plate member,
wherein the reinforcement member includes an intermediate section between the plurality of vehicle body support sections, the intermediate section facing the bottom plate member from below,
wherein the intermediate section of the reinforcement member is placed to be vertically spaced apart from a vehicle body member located below the intermediate section and facing the intermediate section,
wherein the vehicle body member is a rear fender which faces the reinforcement member from below, and is placed above the vehicle body frame,
wherein the vehicle body frame includes a pair of rail members extending in the forward and rearward direction to be spaced apart from each other in a rightward and leftward direction, and a pair of cross members extending in the rightward and leftward direction to couple the pair of rail members to each other,
wherein the pair of cross members are provided with the vehicle body support sections, respectively,
wherein the vehicle body frame has a space formed between the pair of cross members, and
wherein the intermediate section of the reinforcement member is located above the space.

* * * * *